Sept. 14, 1926.  
F. KOCH  
1,599,474  
ANTIFRICTION SIDE BEARING  
Filed Feb. 18, 1925  2 Sheets-Sheet 2

Witnesses  
Inventor  
Felix Koch,  
By  
Attorney

Patented Sept. 14, 1926.

1,599,474

UNITED STATES PATENT OFFICE.

FELIX KOCH, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

ANTIFRICTION SIDE BEARING.

Application filed February 18, 1925. Serial No. 9,950.

This invention relates to railway cars and particularly to railway cars of the articulated unit type, in which each unit comprises a plurality of car bodies, the adjacent ends of two of which are carried by a single truck, and has for an object to provide side supports or bearings between the truck and the adjacent ends of two of the bodies of a car unit.

Another object of the invention is to provide a roller side bearing for an articulated car unit.

Another object of the invention is to provide a railway side bearing for an articulated car unit which is capable of universal movement.

Another object of the invention is to provide a railway side bearing for an articulated car unit which is rotatably mounted and capable of universal movement.

A further object of the invention is to provide a railway side bearing for an articulated car unit, such bearing having rollers yieldably mounted on a truck adapted to engage one end of one of the bodies of said car.

These and other objects will be apparent from the following description.

Figure 1:
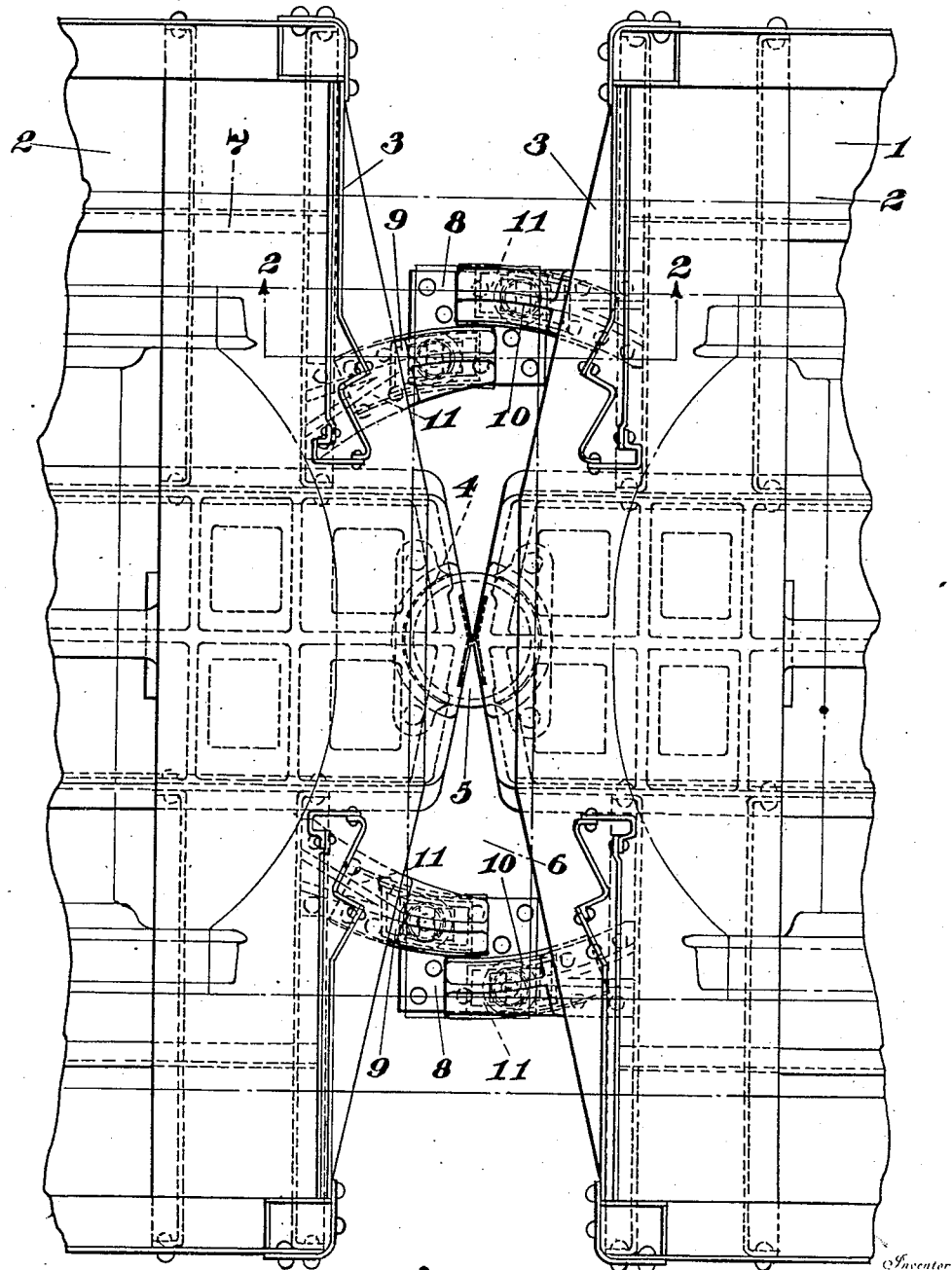
Figure 2:
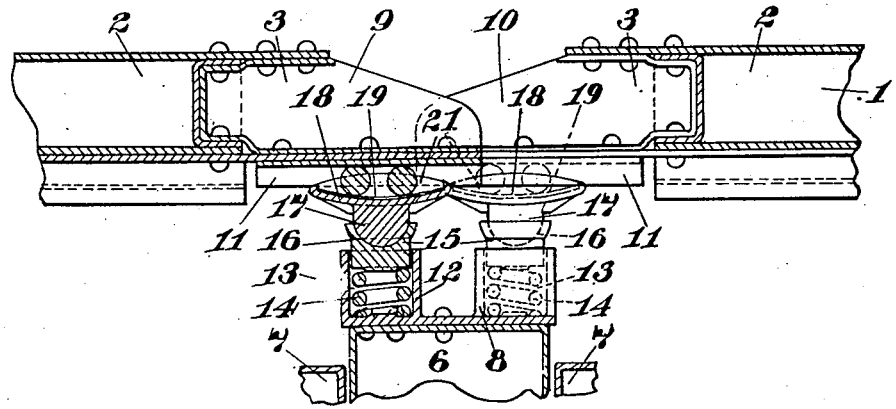
Figure 3:
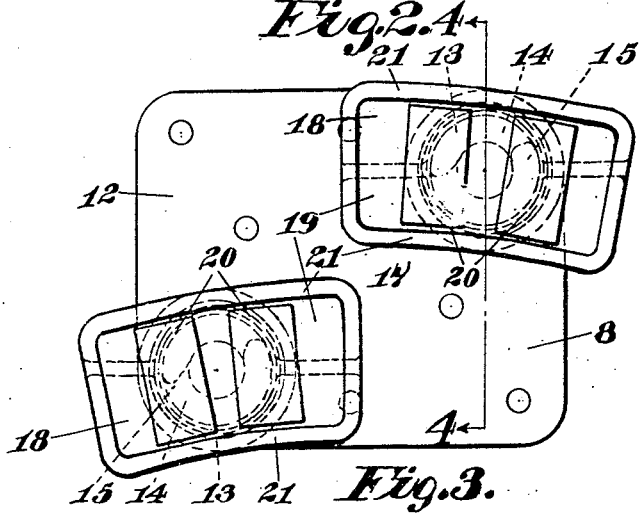
Figure 4:
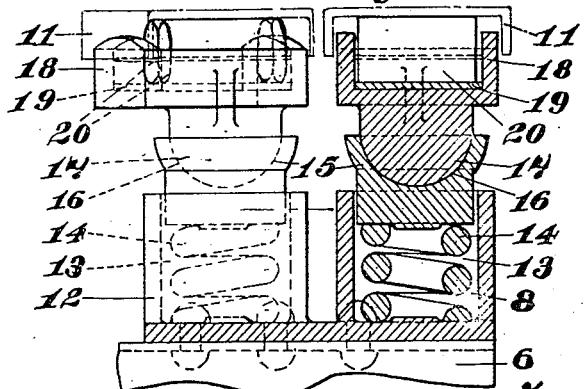

Referring to the drawings in which like reference characters refer to like parts, Fig. 1 is a plan view of portions of the adjacent ends of two car bodies of the articulated car unit embodying the invention; Fig. 2 is a longitudinal sectional view taken on the line 2—2 of Fig. 1; Fig. 3 is an enlarged plan view of the truck side bearing; and Fig. 4 is a sectional view of the same, taken on the line 4—4 of Fig. 3.

Referring now in detail to the drawings the reference character 1 indicates an articulated car unit which comprises a plurality of car bodies 2, the adjacent end portions 3 of two of which have been shown in the drawings. These ends 3 are provided with body center plates 4, both of which engage a truck center plate 5 mounted on a truck bolster 6, which bolster is a part of the truck 7. These center plates 4 and 5 are so formed that they engage with each other in such a manner as to permit the bodies 3 of the unit to move freely relative to each other and to the truck as the car unit rounds a curve or when the bodies sway from side to side. On each side of the longitudinal center line of the truck 7, a truck side bearing 8 is provided which is secured preferably to the top of the bolster 6.

Above the truck side bearings each of the adjacent ends 3 of adjacent underframes is provided with body side bearings which extend outwardly from such ends and are adapted to engage with the truck side bearings. These body side bearings are indicated by the reference characters 9 and 10, the side bearings 9 being secured to the end portion of one of the bodies and the side bearings 10 being secured to the end portion of the adjacent body. These side bearings 9 and 10 are preferably of such length that they overlap each other and are so formed, and spaced transversely of the body that they do not contact with each other as the bodies swivel. Each of these side bearings is provided with downwardly depending flanges 11, the use of which will hereinafter be fully set forth.

Each of the truck side bearings 8 comprises a member 12 which is secured to the bolster 6 and extends upwardly therefrom. In the upper portion of this member spaced recesses or pockets 13 are provided, which open upwardly. Within each of these pockets a spring 14 is seated and upon the upper end of this spring, and within the pocket a member 15 is movably mounted. This member has a recess or pocket 16 formed in its upper part, which recess is for the reception of the lower semi-spherical portion 17 of a shoe member 18, the upper portion 19 of such shoe member being preferably concave, forming a bearing surface for rollers 20, excessive movement of such rollers in the direction of their length being prevented by upwardly extending side flanges 21, preferably integral with the member 18. These rollers are adapted to be engaged by the body side bearings and form an antifriction bearing between the car bodies and the truck. The downwardly depending flanges 11 on the body side bearings are of such a length that they overlap the side flanges of the shoe member and are for the purpose of preventing rotation of the shoe member relative to the member 12. The portion 17 of this shoe is movably mounted in the recess 16 and forms a bearing which will permit universal movement of the shoe member in a substantially horizontal plane, thus insuring the proper engagement between the body and truck side bearings at all times and under all service conditions.

It will be apparent to those skilled in the art to which this invention appertains that changes may be made in the details of the invention without departing from the spirit and scope of the appended claims.

Having thus described the invention, what I claim as new and desire to secure by Letters Patent is:—

1. In a railway car comprising a plurality of connected bodies, a truck for supporting the adjacent ends of two of said bodies, a side bearing on each of said ends, and an anti-friction side bearing on said truck adapted to engage with said bearings and be movable universally in a horizontal plane thereby.

2. In a railway car comprising a plurality of connected bodies, a truck for supporting the adjacent ends of two of said bodies, a side bearing on each of said ends, and a roller side bearing on said truck adapted to engage with one of the body side bearings, on each of said ends.

3. In a railway car comprising a plurality of connected bodies, a truck for supporting the adjacent ends of two of said bodies, a body side bearing on each of said ends and a yieldable anti-friction side bearing mounted on said truck adapted to engage with one of the said body side bearings on each of said ends.

4. In a railway car comprising a plurality of connected bodies, a truck supporting the adjacent ends of two of said bodies, a body side bearing on each of said ends, a truck side bearing comprising a plurality of loosely mounted members adapted to engage with said body side bearings, and means on said body side bearings adapted to prevent undue rotary movement of said loosely mounted members.

5. A truck side bearing for articulated cars comprising a base portion and a plurality of shoe members yieldably mounted on said base, each of said shoe members comprising a plurality of bearing rollers.

6. In a railway car comprising a plurality of bodies, a truck supporting the adjacent ends of two of said bodies, and universally movable roller side bearings interposed between said ends and truck.

7. In a railway car comprising a plurality of bodies, a truck supporting the adjacent ends of two of said bodies, and yieldable roller side bearings between said ends and truck.

8. In an articulated car comprising a plurality of car bodies, a truck supporting the adjacent ends of two of said bodies, and anti-friction side bearings for said bodies, each of said side bearings comprising a base member mounted on said truck, a plurality of shoe members yieldably mounted in said base member, and rollers loosely mounted in said shoe members adapted to be engaged by said bodies.

9. A side bearing for articulated cars, comprising a base portion, a plurality of resilient members mounted in said base portion, vertically movable members mounted on said resilient members, shoe members mounted on said vertically movable members adapted to swivel relative to said members and bearing rollers carried by said shoe members.

10. A side bearing for articulated cars comprising a base portion having spaced recesses formed therein, resilient members mounted in said recesses, shoe members yieldably supported by said resilient means, and bearing rollers carried by said shoe members, and movable bodily relative thereto.

11. A side bearing for the adjacent ends of two adjacent bodies of an articulated car comprising a plurality of yieldably supported and bodily movable rollers.

12. In an articulated car comprising a plurality of car bodies, a truck supporting the adjacent ends of said bodies, and side bearings interposed between said ends and truck, said bearings each comprising a plurality of bodily movable rollers adapted to be engaged by said bodies.

In testimony whereof I affix my signature.

FELIX KOCH.